United States Patent
Hsu

(10) Patent No.: US 8,136,806 B2
(45) Date of Patent: Mar. 20, 2012

(54) CUTTING BOARD WITH PIVOTING BASE

(76) Inventor: Junior Hsu, Northbrook, IL (US)

( * ) Notice: Subject to any disclaimer, the term of this patent is extended or adjusted under 35 U.S.C. 154(b) by 1097 days.

(21) Appl. No.: 11/479,255

(22) Filed: Jun. 30, 2006

(65) Prior Publication Data

US 2008/0001337 A1    Jan. 3, 2008

(51) Int. Cl.
*B23Q 3/00* (2006.01)

(52) U.S. Cl. .................. 269/289 R; 269/302.1

(58) Field of Classification Search .......... 90/797, 90/798, 606.19, 606.18, 606.15; 248/97, 248/346.3, 188.7, 188.6, 186.1, 462, 474, 248/150, 472, 145, 460, 473; 269/289 R, 269/302.1, 901

See application file for complete search history.

(56) References Cited

U.S. PATENT DOCUMENTS

| | | | |
|---|---|---|---|
| 780,052 A * | 1/1905 | Mohlberg | 40/747 |
| 1,864,077 A | 6/1932 | Lewis et al. | |
| 2,189,687 A * | 2/1940 | Thomas | 248/523 |
| 4,127,948 A | 12/1978 | Goy Yu Chin et al. | |
| 4,545,768 A | 10/1985 | Hinnen | |
| 5,022,620 A | 6/1991 | Scott | |
| 5,031,683 A | 7/1991 | Marvy et al. | |
| 5,054,507 A | 10/1991 | Sparks | |
| D321,799 S | 11/1991 | Marvy et al. | |
| 5,085,416 A * | 2/1992 | Miyake et al. | 269/289 R |
| 5,399,140 A | 3/1995 | Klippel | |
| 5,402,988 A | 4/1995 | Eisele | |
| 5,419,065 A | 5/1995 | Lin | |
| 5,996,983 A * | 12/1999 | Laurenzi | 269/289 R |
| 6,257,559 B1 | 7/2001 | Mouri | |
| 6,676,113 B2 | 1/2004 | Christensen et al. | |
| 6,939,021 B2 | 9/2005 | Leslie et al. | |
| 7,040,611 B2 * | 5/2006 | Poynton | 269/289 R |

* cited by examiner

*Primary Examiner* — Lee D Wilson

(74) *Attorney, Agent, or Firm* — Olson & Cepuritis, Ltd.

(57) ABSTRACT

A cutting board with a planar cutting surface and a stand pivotally mounted thereto. The stand supports the cutting board in a generally vertical position to facilitate frequent washing and drainage for healthier food processing.

8 Claims, 1 Drawing Sheet

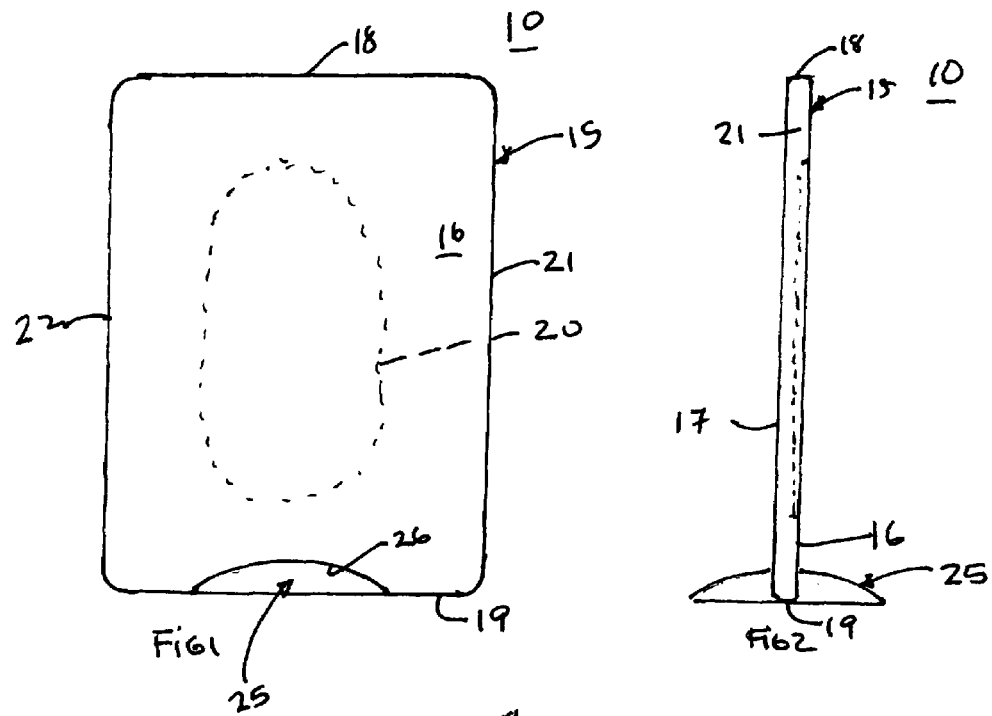
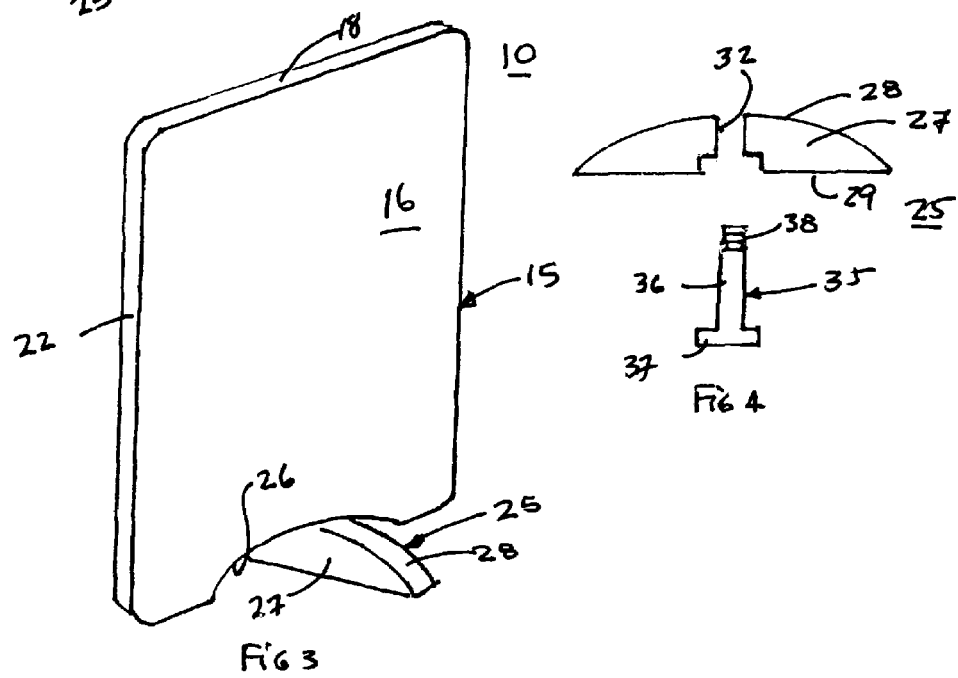

CUTTING BOARD WITH PIVOTING BASE

FIELD OF THE INVENTION

This invention relates to a cutting board of the type commonly found in the home used for cutting various items including, but not limited to poultry, meats, vegetables, fruits and the like.

BACKGROUND OF THE INVENTION

Much has been written lately about the dangers of preparing raw food, particularly poultry, but including pork and meat without carefully washing the surfaces on which the food is prepared. Now, publications and televisions programs have also indicated that fruits and vegetables can also transmit undesirable organisms and, therefore, it is extremely important for cutting boards and other work surfaces to be carefully and frequently washed and disinfected, both during and after use. Particularly, in preparing a meal, if poultry, fish or meat is prepared on a cutting board and thereafter fruits or vegetables are also prepared on the cutting board without intervening washing, there is a real likelihood that dangerous organisms such as *e coli* or others can be transmitted unknowingly to the food.

SUMMARY OF THE INVENTION

Accordingly, an object of the present invention is to provide an improved cutting board which facilitates washing, draining and drying.

Another object of the present invention is to provide a cutting board with an integral stand which facilitates draining the cutting board immediately after washing.

Another object of the present invention is to provide a cutting board having a generally planar cutting surface terminating in an edge having a straight portion thereof, and a stand pivotally mounted in the straight portion moveable between a storage position wherein the stand is generally coplanar with the cutting surface and a drainage position wherein the stand supports the generally planar cutting surface in a generally vertical position to facilitate draining and drying of the cutting board.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a first embodiment of the present invention;

FIG. 2 is an elevational view of the embodiment of FIG. 1 as seen from the right hand side thereof;

FIG. 3 is a perspective view of a second embodiment of the present invention similar to FIG. 1 with the stand in the drainage position thereof; and FIG. 4 is an exploded elevational view of the stand and connecting mechanism therefor.

DETAILED DESCRIPTION OF THE INVENTION

The figures show a cutting board 10 which is comprised of a generally rectangular and generally planar member 15 having a cutting surface 16. The member 15 is generally, but not necessarily, rectangular in shape having a top edge 18 and an opposed and parallel bottom edge 19, both of which preferably but not necessarily are flat. Opposed side edges 21 and 22 interconnect the ends 18 and 19. The cutting surface 16 has an opposed general planar surface 17 and may be, but not necessarily, provided with an indentation 20 for the purposes of holding material to be chopped or cut, such as a small chicken, or if the cutting board 10 is larger, a turkey or the like, all as well known in the art. The recessed area 20 is shown for illustration as an oval but it may be any other convenient shape and may have a portion thereof for collecting juices, all as well known in the art.

As seen from the figures, the bottom edge 19 is generally flat and straight but has within it an arcuate portion 26 into which fits a stand 25 which is pivotally mounted to the cutting board 10. The cutting board 10 and stand 25 are constructed and arranged so that the stand 25 includes a generally arcuate portion 27 having a curved or arcuate edge 28 and a flat edge 29 along with an aperture 32 therewithin. The stand 25 is pivotally mounted to the board by means of a fastener 35 including a head portion 37, a shank 36 and a tapped portion 38 such that the stand is movable between a drainage position in which the stand 25 is pivotally moved out of plane of the member 15 to a position which may preferably, but not necessarily, be perpendicular to the cutting surface 16 so as to support the cutting board 10 in a generally vertical position to facilitate drying and draining of the board.

As seen from the drawing, the stand 25 is movable between a storage position in which the stand 25 is generally coplanar with the member 15 and particularly forms a generally flat planar surface with the cutting surface 16 and a drainage position in which the stand is rotated relative to the cutting surface 16 and member 15 so as to support same in a generally vertical position to facilitate drainage and drying.

The cutting board 10 may be made out of a variety of materials, each having their own advantages and disadvantages. For instance, the board 10 may be made of metal, wood or plastic. Metal may be heavy but may clean easier; wood may be aesthetically pleasing but bacteria and other undesirable organics are easily retained thereon; and plastic may be lighter and less expensive but may or may not be as aesthetically pleasing, as for instance wood. The preferred material of the subject invention is an acrylic or polyacrylene since it is inexpensive, light weight and easily cleaned. The board 10 as illustrated is generally rectangular in plan view but may be oval or any other shape which lends itself to the use of a stand 25 generally supporting the board in a position to facilitate drainage and frequent washing and drying. The principal object of this invention is to provide the consumer with an easy way frequently to wash and drain the cutting board to facilitate the healthier use of the cutting board in the home. Although illustrated with a threaded shaft 35, the fastening mechanism may be a variety of different types including a bearing and shaft to facilitate rotation of the stand 25 with respect to the member 15.

While there has been disclosed what is considered to be the preferred embodiment of the present invention, it is understood that various changes in the details may be made without departing from the spirit, or sacrificing any of the advantages of the present invention.

What is claimed is:

1. A cutting board having a both an arcuate portion and generally planar cutting surface terminating in an edge having both said arcuate portion and straight portions thereof, and a stand pivotally mounted in said arcuate portion moveable between a cutting position wherein said stand is generally coplanar with said cutting surface and a drainage position wherein said stand supports said generally planar cutting surface in a generally vertical position to facilitate draining and drying of said cutting board.

2. The cutting board of claim 1, wherein said stand arcuate edge portion is complementary in shape to said arcuate portion in said edge having said straight portions.

3. The cutting board of claim 1, wherein said board and said stand are polyacrylate.

4. The cutting board of claim 1, wherein said generally planar cutting surface is flat.

5. The cutting board of claim 1, wherein said generally planar cutting surface has a concave indentation in said generally planar cutting surface.

6. The cutting board of claim 1, wherein both said stand and said cutting surface are the same acrylic resin.

7. The cutting board of claim 1, wherein said generally planar cutting surface and said stand are substantially perpendicular to each other when said strand is in the drainage position thereof.

8. The cutting board of claim 1, wherein said stand is freely rotatable with respect to said cutting surface through 360°.

* * * * *